United States Patent
Zhao et al.

(10) Patent No.: US 9,630,871 B2
(45) Date of Patent: Apr. 25, 2017

(54) SYSTEM FOR PLACING VACUUM GLASS MIDDLE SUPPORTS

(75) Inventors: Yan Zhao, Henan (CN); Yanbing Li, Henan (CN); Shitao Pang, Henan (CN); Jianbo Shi, Henan (CN)

(73) Assignee: LUOYANG LANDGLASS TECHNOLOGY CO., LTD, Henan (CN)

( * ) Notice: Subject to any disclaimer, the term of this patent is extended or adjusted under 35 U.S.C. 154(b) by 581 days.

(21) Appl. No.: 14/238,931

(22) PCT Filed: Nov. 2, 2011

(86) PCT No.: PCT/CN2011/081665
§ 371 (c)(1),
(2), (4) Date: Feb. 14, 2014

(87) PCT Pub. No.: WO2013/033945
PCT Pub. Date: Mar. 14, 2013

(65) Prior Publication Data
US 2014/0202637 A1 Jul. 24, 2014

(30) Foreign Application Priority Data
Sep. 9, 2011 (CN) .............................. 2011 1 026794

(51) Int. Cl.
*C03B 23/24* (2006.01)
*E06B 3/673* (2006.01)
(Continued)

(52) U.S. Cl.
CPC ............ *C03B 23/24* (2013.01); *B23P 21/004* (2013.01); *E06B 3/6612* (2013.01);
(Continued)

(58) Field of Classification Search
CPC .... E06B 5/205; E06B 3/6612; E06B 3/66304; E06B 3/67326; E06B 3/67365;
(Continued)

(56) References Cited

U.S. PATENT DOCUMENTS 6,420,002 B1    7/2002  Aggas et al.

FOREIGN PATENT DOCUMENTS

CN    101481206 A    7/2009
CN    101698565 A    4/2010
(Continued)

OTHER PUBLICATIONS

Translation of JPH11247539A.*
Translation of DE 2315673 A1.*

*Primary Examiner* — Christopher Besler
*Assistant Examiner* — Matthew P Travers
(74) *Attorney, Agent, or Firm* — AKC Patents, LLC; Aliki K. Collins

(57) ABSTRACT

The present invention discloses a vacuum glass middle support placing system that includes a glass plate placing station, a middle support placing station, a vacuum sealing station, a pallet and a conveyor. The pallet is directly conveyed by the conveyor to transfer it among the stations and the glass plate is placed on the pallet at the glass plate placing station. The pallet includes a supporting face that is matched with a surface of the glass plate and a glass plate positioning structure. A magnetic attraction surface array made of permanent magnets and corresponding to the middle supports to be placed on the glass plate is arranged on the supporting face.

11 Claims, 5 Drawing Sheets

(51) Int. Cl.
  *B23P 21/00*   (2006.01)
  *E06B 3/677*   (2006.01)
  *E06B 3/66*    (2006.01)
  *E06B 3/663*   (2006.01)
  *E06B 5/20*    (2006.01)

(52) U.S. Cl.
  CPC ........ *E06B 3/66304* (2013.01); *E06B 3/6775* (2013.01); *E06B 3/67326* (2013.01); *E06B 3/67365* (2013.01); *B23P 2700/12* (2013.01); *E06B 5/205* (2013.01); *Y02B 80/24* (2013.01); *Y10T 29/49829* (2015.01); *Y10T 29/534* (2015.01); *Y10T 29/53435* (2015.01); *Y10T 29/53483* (2015.01); *Y10T 29/53548* (2015.01)

(58) Field of Classification Search
  CPC ...... E06B 3/6775; C03B 23/24–23/245; C03B 2225/02; Y02B 80/24; B23P 11/00; B23P 19/008; B23P 21/004; B23P 2700/12; Y10T 29/49629; Y10T 29/49769; Y10T 29/49778–29/4978; Y10T 29/49829; Y10T 29/49895; Y10T 29/49998; Y10T 29/534; Y10T 29/53417; Y10T 29/53435; Y10T 29/53483; Y10T 29/53539–29/53548; Y10T 29/53978; Y10T 29/54
  See application file for complete search history.

(56) References Cited

FOREIGN PATENT DOCUMENTS

DE  2315673 A1 * 10/1974 ......... E06B 3/67365
JP  11-247539 A   9/1999

\* cited by examiner

SYSTEM FOR PLACING VACUUM GLASS MIDDLE SUPPORTS

CROSS REFERENCE TO RELATED CO-PENDING APPLICATIONS

This application claims the benefit of International PCT patent application Serial No. PCT/CN2011/081665 filed Nov. 2, 2011 and entitled "SYSTEM FOR PLACING VACUUM GLASS MIDDLE SUPPORTS", the contents of which are expressly incorporated herein by reference.

This application also claims the benefit of Chinese patent application Serial No. 201110267949.4 filed Sep. 9, 2011 and entitled "SYSTEM FOR PLACING VACUUM GLASS MIDDLE SUPPORTS", the contents of which are expressly incorporated herein by reference.

FIELD OF THE INVENTION

The present invention relates to a placing system for placing middle supports during manufacturing a vacuum glass.

BACKGROUND OF THE INVENTION

Take a vacuum glass with a two-layer structure as an example, the structure of the vacuum glass is generally as shown in FIG. 1 and consists of two glass plates and middle supports arranged in an array form between the two glass plates, and the peripheries of the two glass plates are air-tightly sealed through sealing edges. Certain middle supports in the vacuum glass directly consist of protrusions formed by laser radiation on glass plate surfaces, and certain middle supports consist of placed micro spheres, columns, micro rings or particles of other shapes; for the former, because the protrusions are formed after local melting and solidification of the glass surface, the heights of the protrusions are generally low, the arrangement density is low, the increment of the distance between the two glass plates is limited, and the sound insulation and heat insulation effects of the vacuum glass are reduced; and for the latter, in order to keep the placed micro spheres or columns at the positions, generally adhesive for fixing needs to be applied, and the adhesive releases gas because of the reduction of environmental pressure, so that the vacuum degree is reduced, and long keeping quality of the vacuum glass is affected.

SUMMARY OF THE INVENTION

With respect to the defects of the prior art, the present invention aims to provide a system for placing vacuum glass middle supports. In the system, micro spheres, columns, micro rings or particles with proper shapes capable of being adsorbed by magnetic force are used as middle supports, the placed middle supports are kept at the positions by using magnetic force attraction, and the attraction state is kept all the time from the placing of the middle supports till the vacuum glass is finally sealed in a vacuum chamber, so a condition is created for using the high-strength particles as the middle supports, and the problem of keeping position stability after the middle supports are placed is effectively solved.

In the system for placing vacuum glass middle support, middle supports capable of being adsorbed by magnetic force are used as placed objects in the system; the system comprises a glass plate placing station, a middle support placing station and a vacuum sealing station; a glass plate for placing the middle supports is placed on a pallet; the pallet is directly conveyed by a conveyer belt or a conveying roller table or carried by a conveying trolley to transfer among the stations; the glass plate on which the middle supports are placed is conveyed to a vacuum chamber of the vacuum sealing station together with the pallet, vacuumized, combined and sealed in the vacuum chamber; the pallet is provided with a supporting face matched with the surface of the glass plate and a glass plate positioning structure; and a magnetic attraction surface array made of permanent magnets and corresponding to the middle supports to be placed one by one on the glass plate is arranged on the supporting face.

Further, the magnetic attraction surfaces are circular or elliptic or polygonal.

Further, the pallet comprises a bottom plate, a supporting column array is fixedly arranged on the bottom plate, the upper end faces of all supporting columns are flush and form the supporting face together, and the magnetic attraction surfaces are arranged on the upper end faces of the supporting columns one by one; and the positioning structure is positioned on the periphery of the supporting column array and used for limiting the transverse position, vertical to the supporting face, of the glass plate supported on the supporting columns.

Further, the pallet comprises a bottom plate; a framework for reinforcing is fixed on the periphery of the bottom plate; a column array, the axis of which is vertical to the bottom plate, is fixedly arranged on the bottom plate inside the framework; the upper end faces of all columns form the supporting face together; the magnetic attraction surfaces are circular; circular magnetic attraction surfaces in the magnetic attraction surface array are concentrically arranged on the upper end faces of the columns one by one; and the bottom plate or the framework on the periphery of the column array is provided with a lateral vertical surface for limiting the transverse position, vertical to the supporting face, of the glass plate supported on the supporting columns, so that the glass plate positioning structure is formed.

Further, the columns are made of aluminum or aluminum alloy or made of lightweight nonmetallic material, and permanent magnets for forming the circular magnetic attraction surfaces are embedded and fixed within the columns.

Further, the circular magnetic attraction surfaces consist of the end faces of the cylindrical permanent magnets, or consist of circular surfaces processed on the permanent magnets of other shapes.

Further, the periphery of the combined glass plates is sealed by a metal welding process and welded by adopting induction heating; and the framework is rectangular, four corners of the framework are provided with a supporting block made of nonmetallic material respectively, the supporting block is provided with a supporting surface flush with the supporting face, and meanwhile, the outer side of the supporting surface is also provided with a lateral vertical surface of the positioning structure.

Further, the column is provided with a central through hole, the cylindrical permanent magnet is embedded into the upper end of the central through hole, the lower end of the central through hole is provided with a threaded hole, and the column is fixed on the bottom plate through the threaded hole and a screw; and the side wall of the central through hole is also provided with an exhaust hole for communicating the space between the permanent magnet and the fixing screw and the outside.

Further, the middle support placing station is provided with an automatic quantitative middle support placer and a detection device for detecting whether the middle supports are placed accurately, the automatic quantitative placer is provided with single middle support placing heads in rows, and the positions of the single placing heads correspond to the placing points in the middle support row to be placed one by one; and the automatic quantitative placer is fixedly arranged, and placement of the whole middle support array is completed by moving the pallet, or the automatic quantitative placer is provided with a movement mechanism, and placement of the middle support array is completed by movement of the movement mechanism of the automatic quantitative placer.

Further, the middle supports are micro spheres, columns or micro rings capable of being adsorbed by magnetic force.

Further, the middle supports are spheres made of No. 304 stainless steel, and the diameters of the spheres are 0.3 to 0.7 millimeter.

The placing system of the present invention well solves the problems of placement and positioning of the middle supports of the vacuum glass, and creates conditions for adopting the metallic middle supports with higher strength in the vacuum glass and long keeping the vacuum degree of the vacuum glass stable. Particularly, the supporting of the glass plate during vacuumizing, combining and sealing and the supporting during placing the middle supports are completed by a pallet, and it is convenient for transferring the glass plates among the processes, the structure of the whole system is simplified, and technical guarantee is provided for realizing automatic production of the vacuum glass.

DETAILED DESCRIPTION OF THE INVENTION

Figure 1:
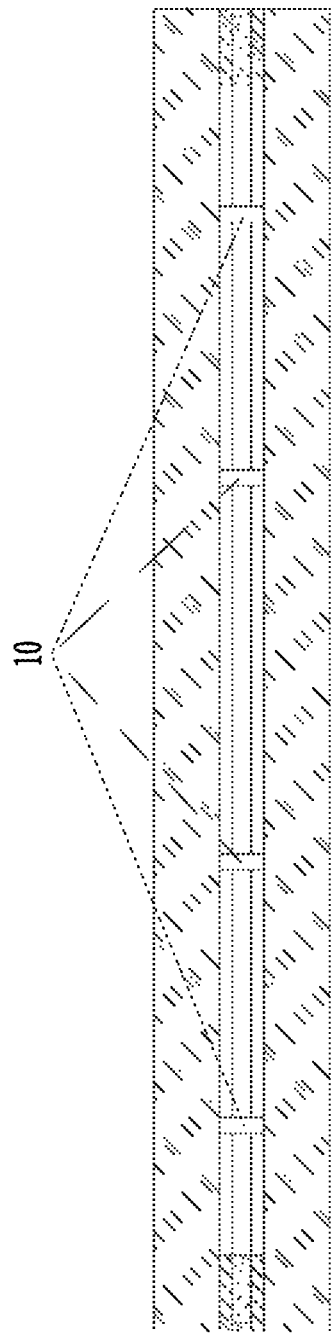
FIG. 1 is a structural schematic figure of a vacuum glass.

The present invention is described by referring to the drawings.

Figure 2:
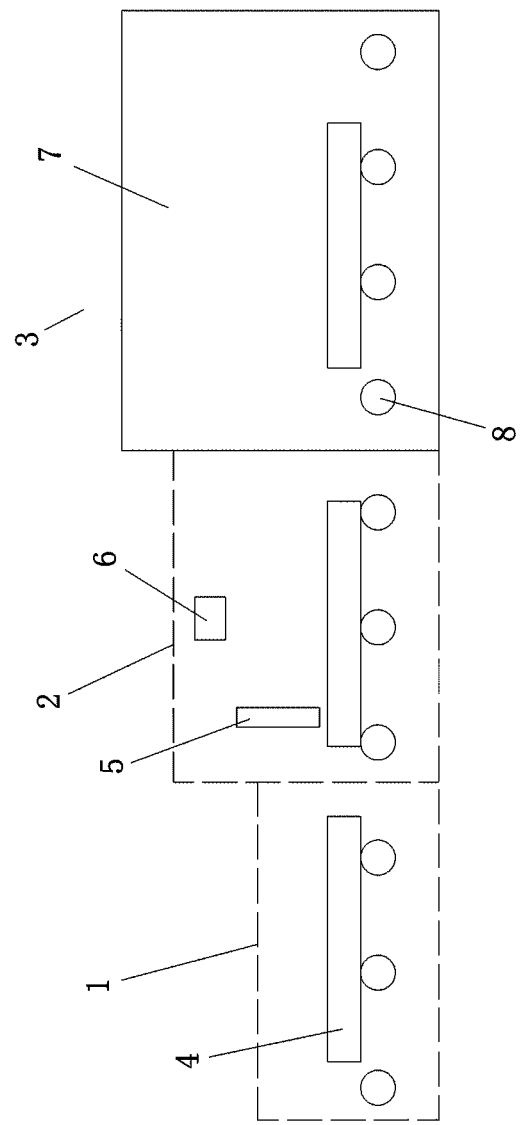
FIG. 2 is a schematic figure of a placing system of the present invention.

In the system for placing vacuum glass middle supports, middle supports capable of being adsorbed by magnetic force and made of ferromagnetic material are used as placed objects, as shown in the FIG. 2. The system comprises a glass plate placing station 1, a middle support placing station 2 and a vacuum sealing station 3; a glass plate for placing the middle supports is placed on a pallet 4; the pallet 4 is directly conveyed by a conveying roller table 8 to transfer among the stations; the glass plate on which the middle supports are placed is conveyed to a vacuum chamber 7 of the vacuum sealing station 3 together with the pallet 4, vacuumized, combined and sealed in the vacuum chamber 7.

Figure 3:
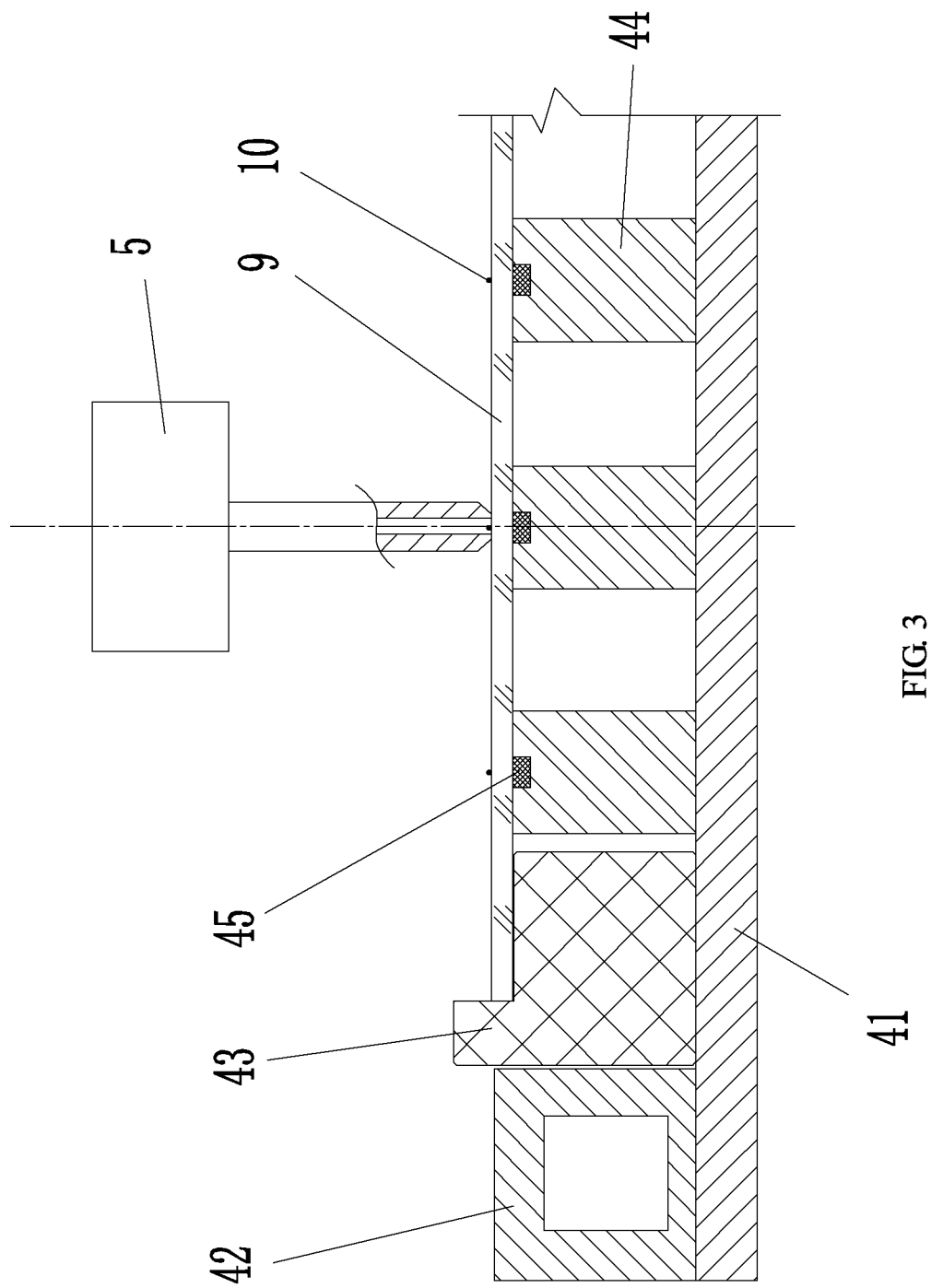
FIG. 3 is a schematic figure of a section view structure of a pallet part shown as a sequence number 4 in the FIG. 2.
Figure 4:
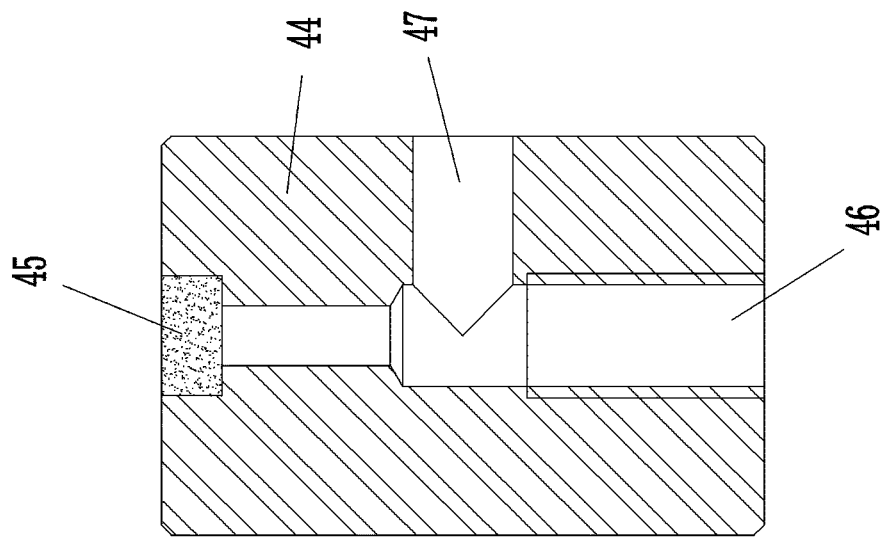
FIG. 4 is a section view of a column shown as a sequence number 44 in the FIG. 3.
Figure 5:
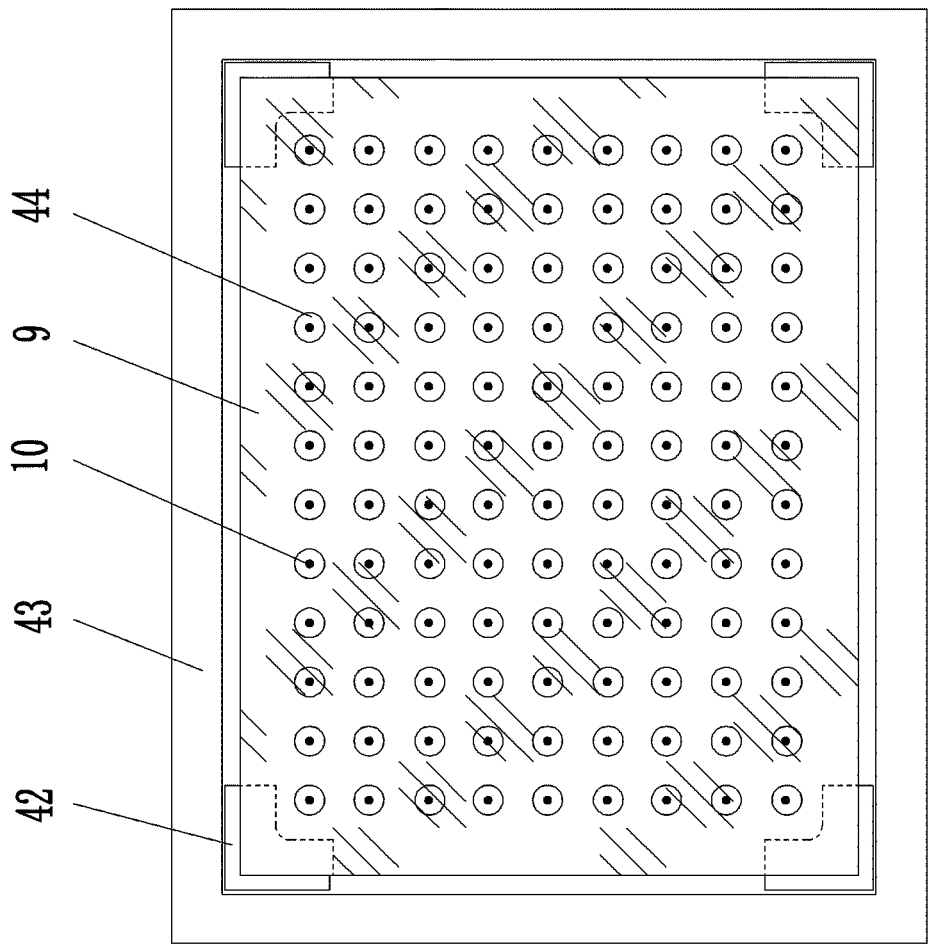
FIG. 5 is a vertical view of a pallet 4.

As shown in the FIG. 3 to the FIG. 5, the pallet 4 is rectangular and comprises a bottom plate 41; a framework 42 for reinforcing is fixed on the periphery of the bottom plate 41; a column 44 array, the axis of which is vertical to the bottom plate 41, is arranged on the bottom plate 41 inside the framework 42; and four corners of the inner side of the framework 42 on the periphery of the column 44 array are provided with a glass plate supporting block 43 made of nonmetallic material respectively.

A column 44 is made of aluminum or aluminum alloy or made of nonmetallic material such as plastic, nylon and the like, the column 44 is provided with a central through hole 46, the lower end of the central through hole 46 is provided with a thread section, the column 44 is matched with a screw (not shown in the figures) through the thread section at the lower end of the central through hole 46 of the column 44 and fixed on the bottom plate 41, a cylindrical permanent magnet 45 is embedded at the upper end of the central through hole 46, and the outer end face of the permanent magnet 45 is flush with the upper end face of the column 44, so that a circular magnetic attraction surface concentrically arranged with the upper end face of the column 44 is formed on the upper end face. The diameter of the cylindrical permanent magnet 45 is 1.5 to 5 millimeters, and the permanent magnet 45 has a proper height such as 3 millimeters. The side wall of the central through hole 46 of the column 44 is also provided with an exhaust hole 47 for communicating the space between the permanent magnet 45 and the fixing screw and the outside; and by setting the exhaust hole 47, air can be prevented from being sealed in the central through hole 46 of the column 44 after the column 44 is arranged, and adverse effect on vacuumizing of the vacuum chamber 7 is avoided.

The upper end faces of the columns 44 are flush and positioned on the same plane as the glass plate supporting face on the supporting block 43 so as to form a supporting face of a glass plate 9 together. The columns 44 in the column array correspond to the positions of the middle supports 10 in the middle support array to be placed on the glass plate 9 one by one; and when the column array realizes supporting to the glass plate 9, the circular magnetic attraction surfaces on the columns 44 form a circular magnetic attraction surface array corresponding to the middle support array to be placed.

The supporting block 43 is provided with a glass plate supporting face flush with the upper end face of the column 44, and the outer side of the glass plate supporting face of the supporting block 43 is provided with a lateral vertical surface for limiting the transverse position of the glass plate 9.

Certainly, a positioning device corresponding to the side of the glass plate 9 can also be arranged on the bottom plate 41.

The glass plate 9 on which the middle supports 10 are placed is carried to the vacuum chamber 7 by the pallet 4 and combined with other glass plate for forming the vacuum glass in the vacuum chamber 7, and then the periphery of the glass plate is sealed by adopting a metal welding process and welded by induction heating, so induction heating during welding can be avoided by adopting a nonmetallic material for manufacturing the supporting block 43.

Figure 6:
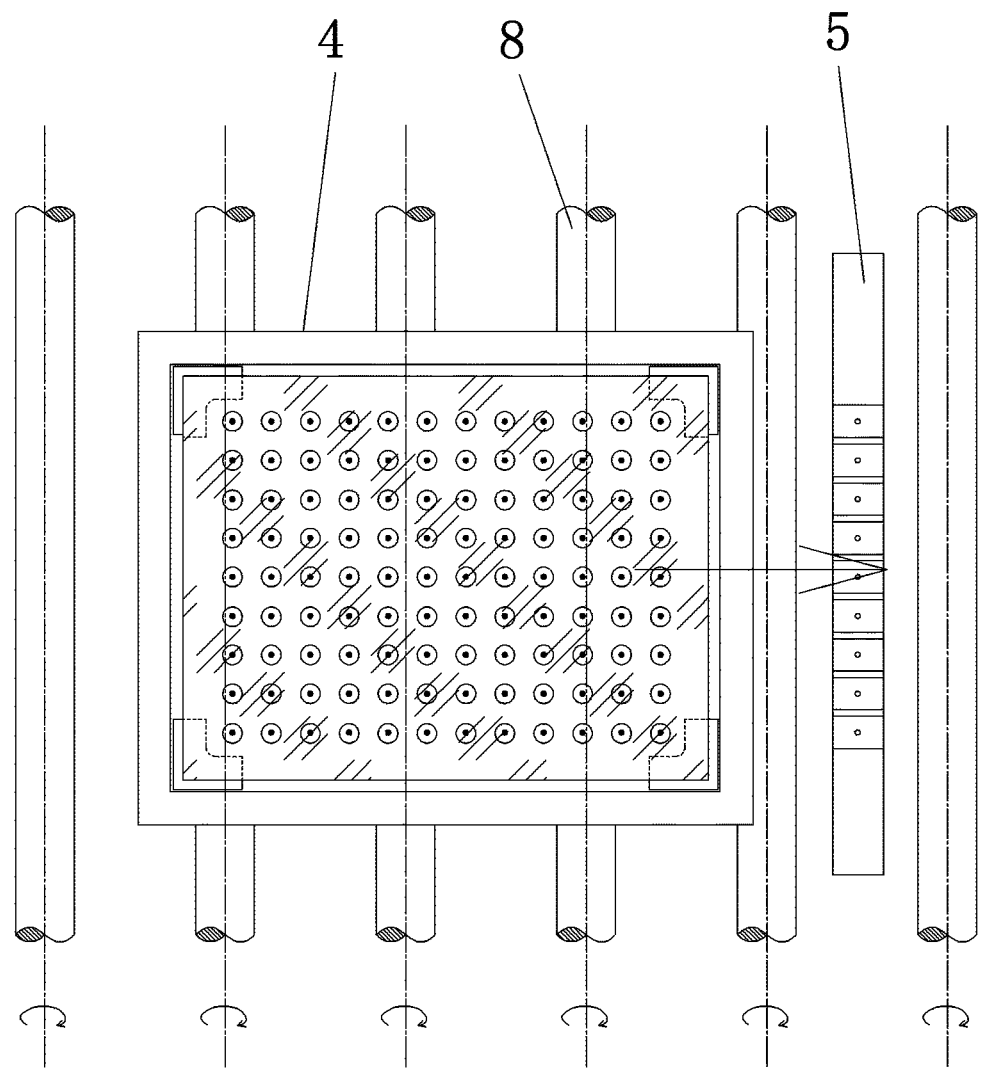
FIG. 6 is a local vertical view of the placing system of the present invention.
Figure 7:
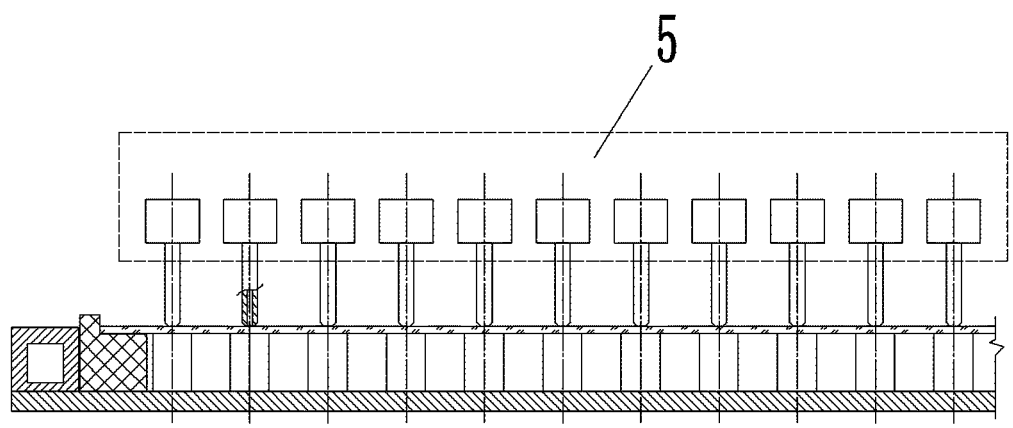
FIG. 7 is a state schematic figure when middle supports are placed by the placing system of the present invention.

The middle supports 10 on the glass plate 9 can be placed manually and can also be placed by using an automatic quantitative placer 5 as shown in the FIG. 6 and the FIG. 7. When the placer 5 is used for placing, in order to avoid missing placement or repeated placement, a special detection device 6 can also be arranged on the middle support placing station 2; and when missing placement or repeated placement happens, remediation is timely performed. The detection device 6 can be a known image acquisition and analysis system, and can also be other known detection device.

The automatic quantitative placer 5 consists of a plurality of middle support placing heads; in order to improve the placing efficiency, the placing heads are preferably arranged in rows; and the number and the positions of the placing heads in each row preferably correspond to the middle supports in the row to be placed in the middle support array to be placed one by one. The automatic quantitative placer 5 can be fixedly arranged; and once a row of middle supports 10 is placed, the placement of the whole middle support array is completed by moving the pallet 4 (along the direction pointed by an arrow in the FIG. 6). The automatic quantitative placer 5 can also provided with a movement mechanism, and after the pallet 4 carrying the glass plate 9 moves to the lower part of the placer 5, the placement of the middle support array is completed by moving the placer 5.

The middle supports 10 are spheres made of No. 304 stainless steel, and the diameters of the spheres are 0.3 to 0.7 millimeter.

Certainly, the middle supports 10 can also be micro columns or micro rings capable of being adsorbed by magnetic force and made of ferromagnetic material.

The pallet 4 in the embodiment is placed on a roller table 8 consisting of a plurality of conveying rollers, in addition, the pallet 4 can also be conveyed by a conveyer belt among the stations, and the pallet 4 can also be conveyed by a conveying mechanism with a conveying trolley among the stations.

The pallet 4 in the embodiment is used for processing a vacuum glass product of a rectangular structure; and when vacuum glass products of other shapes are processed, the shape of the pallet 4 is correspondingly adjusted to adapt the shape of the vacuum glass.

The supporting block 43 can only be used for limiting a transverse position vertical to the supporting face of the glass plate 9 and is arranged at the position corresponding to the side of the glass plate.

In order to support the glass plate 9, besides the column 44 array, a supporting column array of other section shape can also be adopted, and the circular magnetic attraction surfaces on the upper end faces of the supporting columns can be replaced by magnetic attraction surfaces of other shapes such as ellipse, rectangle, triangle, polygon and the like.

Under the condition of ensuring that the attraction surfaces in the circular magnetic attraction surface array correspond to the middle supports in the middle support array to be placed one by one, the circular magnetic attraction surfaces on the upper end faces of the columns 44 can also be not arranged concentric with the middle supports.

The supporting face of the glass plate 9 consists of a supporting column array which is favorable for processing the supporting face, and moreover, the supporting face can also consist of the upper surface of the bottom plate 41.

When the vacuum glass is processed, if the plate combining operation is first performed and then vacuumizing is performed, the clearance between the two adjacent combined plates is only a few millimeters such as 0.2 millimeter, gas molecules escape to from the clearance difficultly, the vacuumizing time is greatly prolonged, and the vacuum glass is difficult to reach high vacuum degree. The pallet 4 serving as an attraction and positioning device for the middle supports 10 on the glass plate 9 in the placing system of the present invention enters the vacuum chamber together with the glass plate 9, so that the glass plates for forming the vacuum glass can be combined and then sealed after the vacuum chamber is vacuumized to reach the required vacuum degree, the problems caused by vacuumizing after the plates are combined can be avoided, the processing efficiency of the vacuum glass is ensured, and the vacuum quality of the vacuum glass is ensured.

Particularly, the embodiment is only used for explaining the present invention. Various embodiments made by the skilled in the art and in accordance with the thought of the present invention are within the protected range of the present invention.

The invention claimed is:

1. A system for placing vacuum glass middle supports capable of being attracted by magnetic force comprising:
   a glass plate placing station, a middle support placing station and a vacuum sealing station;
   a pallet; and
   a conveyor comprising one of a conveyer belt, a conveying roller table or a conveying trolley; wherein the system is configured such that:
   the pallet is directly conveyed by the conveyer to transfer it among the stations;
   a glass plate is placed on the pallet at the glass plate placing station;
   the middle supports are placed on the glass plate at the middle support placing station;
   the glass plate on which the middle supports are placed is conveyed to a vacuum chamber of the vacuum sealing station together with the pallet;
   the vacuum chamber is vacuumized;
   the glass plate and the middle supports are combined with another glass plate and sealed in the vacuum chamber;
   wherein the pallet is provided with a supporting face matched with a surface of the glass plate and a glass plate positioning structure; and
   wherein a magnetic attraction surface array made of permanent magnets and corresponding to the middle supports to be placed on the glass plate is arranged on the supporting face.

2. The system according to the claim 1, wherein the magnetic attraction surfaces are circular or elliptic or polygonal.

3. The system according to the claim 1, wherein the pallet comprises a bottom plate, and a supporting column array fixedly arranged on the bottom plate, and wherein upper end faces of all supporting columns are flush and form the supporting face together, and the magnetic attraction surfaces are arranged on the upper end faces of the supporting columns; and the positioning structure is positioned on the periphery of the supporting column array and used for limiting the transverse position, vertical to the supporting face, of the glass plate supported on the supporting columns.

4. The system according to the claim 1, wherein the pallet comprises a bottom plate; a framework for reinforcing is fixed on the periphery of the bottom plate; a column array, the axis of which is vertical to the bottom plate, is fixedly arranged on the bottom plate inside the framework; upper end faces of all columns form the supporting face together; the magnetic attraction surfaces are circular; circular magnetic attraction surfaces in the magnetic attraction surface array are concentrically arranged on the upper end faces of the columns; and the bottom plate or the framework on the periphery of the column array is provided with a lateral vertical surface for limiting the transverse position, vertical to the supporting face, of the glass plate supported on the supporting columns, so that the glass plate positioning structure is formed.

5. The system according to the claim 4, wherein the columns are made of aluminum or aluminum alloy or made of any nonmetallic material, and the permanent magnets for forming the circular magnetic attraction surfaces are embedded and fixed within the columns.

6. The system according to the claim 5, wherein the circular magnetic attraction surfaces comprise end faces of the cylindrical permanent magnets, or comprise circular surfaces processed on the permanent magnets of other shapes.

7. The system according to the claim 6 wherein each column is provided with a central through hole, each cylindrical permanent magnet is embedded into the upper end of the central through hole, the lower end of the central through hole is provided with a threaded hole, and each column is fixed on the bottom plate through the threaded hole and a screw; and the side wall of the central through hole is also provided with an exhaust hole for communicating the space between the permanent magnet and the fixing screw and the outside.

8. The system according to the claim 4, wherein the periphery of combined glass plates is sealed by a metal welding process; and wherein the framework is rectangular, four corners of the framework are provided with a supporting block made of nonmetallic material respectively, the supporting block is provided with a supporting surface flush with the supporting face, and meanwhile, the outer side of the supporting surface is also provided with a lateral vertical surface of the positioning structure.

9. The system according to the claim 1 wherein the middle support placing station is provided with an automatic middle support placer and a detection device for detecting whether the middle supports are placed accurately, wherein the automatic middle support placer is provided with individual middle support placing heads in rows, and the positions of the individual placing heads correspond to the placing points in the middle support row to be placed individually; and wherein the automatic middle support placer is fixedly arranged, and wherein the whole middle support array is configured to be placed by moving the pallet, or the automatic middle support placer is provided with a movement mechanism, and the middle support array is configured to be placed by the movement mechanism of the automatic middle support placer.

10. The system according to the claim 1, wherein the middle supports comprise microspheres, microcolumns or microrings capable of being attracted by magnetic force.

11. The system according to the claim 1 wherein the middle supports comprise spheres made of No. 304 stainless steel, and the diameters of the spheres are 0.3 to 0.7 millimeter.

* * * * *